(12) United States Patent
Cooper et al.

(10) Patent No.: US 10,924,181 B2
(45) Date of Patent: *Feb. 16, 2021

(54) RETURN PATH CONGESTION MITIGATION FOR SATELLITE COMMUNICATIONS

(71) Applicant: Higher Ground LLC, Palo Alto, CA (US)

(72) Inventors: Timothy Reed Cooper, Centreville, VA (US); Bruce Leonard McKinley, South Riding, VA (US); Scott A. McDermott, Washington, DC (US); Mark Evan Russell, Pine Grove, CA (US); David Daugherty, Jackson, CA (US); Shmuel Shaffer, Palo Alto, CA (US)

(73) Assignee: HIGHER GROUND LLC, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/514,047

(22) Filed: Jul. 17, 2019

(65) Prior Publication Data
US 2019/0341999 A1  Nov. 7, 2019

Related U.S. Application Data

(63) Continuation of application No. 15/722,425, filed on Oct. 2, 2017, now Pat. No. 10,404,358.

(51) Int. Cl.
*H04B 7/185* (2006.01)
*H04L 12/26* (2006.01)
(Continued)

(52) U.S. Cl.
CPC ....... *H04B 7/18586* (2013.01); *H04B 7/1858* (2013.01); *H04B 7/18515* (2013.01);
(Continued)

(58) Field of Classification Search
CPC ............ H04B 7/18586; H04B 7/18515; H04B 7/1858; H04L 43/16; H04L 47/122; H04L 43/0882; H04W 28/0236
See application file for complete search history.

(56) References Cited

U.S. PATENT DOCUMENTS 5,841,848 A * 11/1998 Dunn ...................... H04M 3/36
379/138
10,404,358 B2 * 9/2019 Cooper ................. H04L 47/122
(Continued)

*Primary Examiner* — Afshawn M Towfighi
(74) *Attorney, Agent, or Firm* — Behmke Innovation Group LLC; James M. Behmke; James J. Wong

(57) ABSTRACT

In one embodiment, a communicating device (e.g., either a ground station server or a particular distributed module of a satellite communication system) mitigates congestion on a particular return communication path via an intermediate satellite from the plurality of distributed modules to the ground station server. In particular, in response to determining that the level of congestion is above a threshold, then the communication device mitigates the congestion by, e.g., one or both of either a) determining an uncongested return communication path from a particular distributed module to the ground station server, ensuring that the uncongested return communication path would not interfere with any unintended receiver, and then causing the particular distributed module to use the uncongested return communication path, and b) enforcing one or more communication restrictions on a utilized return communication path to reduce the effect of a communication on the overall congestion of the utilized return communication path.

23 Claims, 12 Drawing Sheets

(51) Int. Cl.
*H04L 12/803* (2013.01)
*H04W 28/02* (2009.01)

(52) U.S. Cl.
CPC .......... *H04L 43/0882* (2013.01); *H04L 43/16* (2013.01); *H04L 47/122* (2013.01); *H04W 28/0236* (2013.01)

(56) References Cited

U.S. PATENT DOCUMENTS

2017/0171868 A1    6/2017   Reis et al.
2018/0092020 A1*  3/2018   Torres ................ H04B 7/18521

* cited by examiner

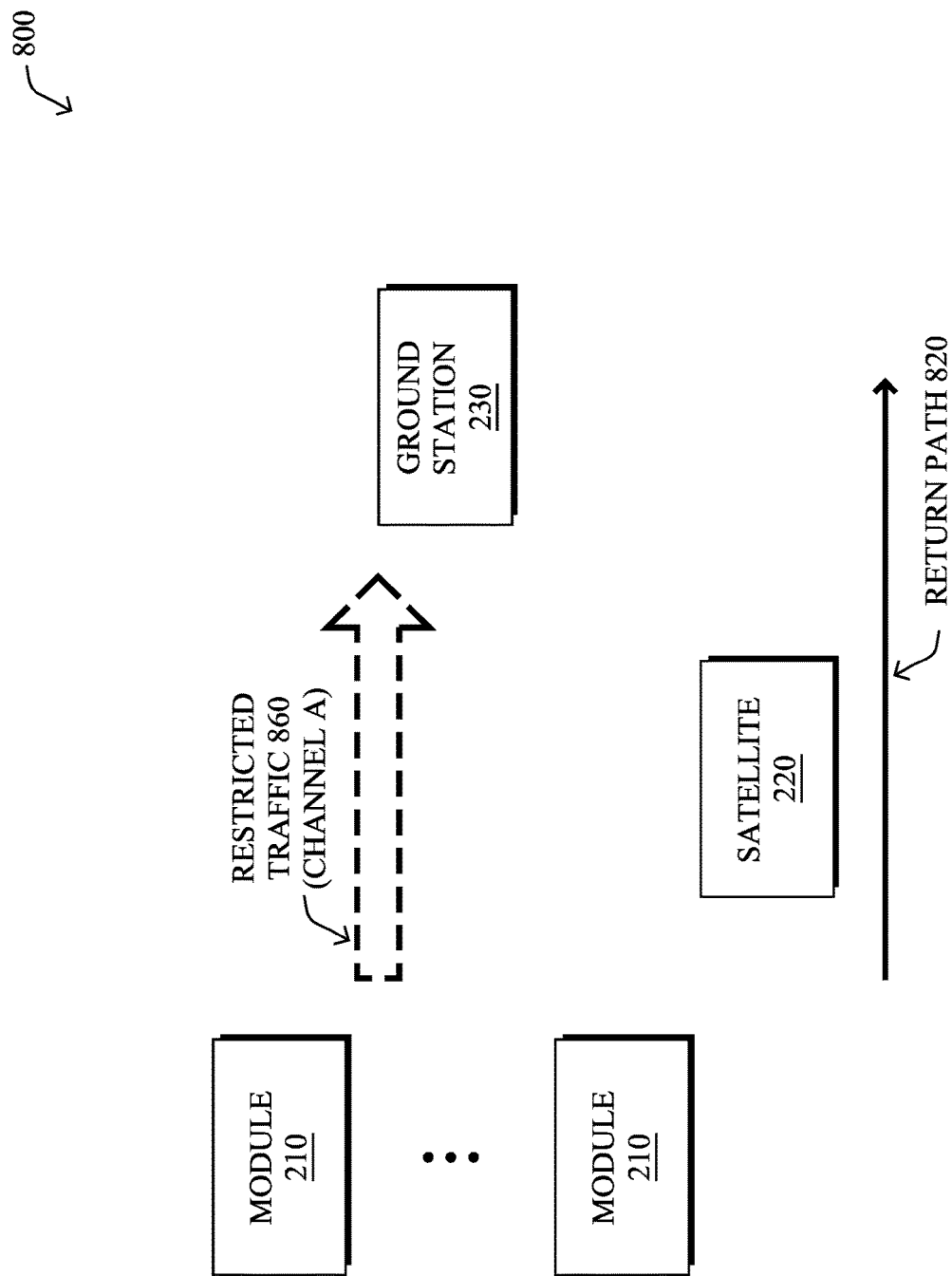

RETURN PATH CONGESTION MITIGATION FOR SATELLITE COMMUNICATIONS

RELATED APPLICATION

This application is a continuation of U.S. patent application Ser. No. 15/722,425, filed on Oct. 2, 2017, entitled RETURN PATH CONGESTION MITIGATION FOR SATELLITE COMMUNICATIONS, by Cooper et al., the contents of which are incorporated herein by reference.

TECHNICAL FIELD

The present disclosure relates generally to satellite communication systems, and, more particularly, to return path congestion mitigation for satellite communications.

BACKGROUND

As will be well understood by those skilled in the art, congestion occurs when a large number of users/devices contend for limited resources.

For instance, in the plain old telephony (POT) domain, a plurality of users may use a private branch exchange (PBX) with a limited number of trunks. As a result, when more users than the available number of trunks attempt to place an outbound call at the same time some of the users will not be able to obtain an outside line, thus resulting in being prevented from placing the outbound call. For example, assume a company with 1000 employees has a PBX with 100 trunk lines connecting the PBX to a central office. When the first 100 employees attempt to place an outside call at approximately the same time, they would be able to get an outside line and place outgoing calls. If another employee attempts to place an outbound call at the same time when the 100 trunk lines are used by the first 100 callers, that call would fail and the user may hear a busy tone, a turkey tone, or a specific message advising him that all outside lines are busy. The ongoing calls of the first 100 users/employees would continue uninterrupted. In this case each user uses a dedicated resource which is controlled by a central call processing program which has visibility to the utilization of each resource; new users are prevented from accessing resources which are used by other callers thus allowing the first users to continue using the resource without interruption.

In computer networks (e.g., Internet Protocol or "IP" networks), traffic from various users traverses a common media which has limited capacity. To ensure communication integrity only one user can utilize the common media at the same time requiring interleaving in time messages from different users. Unlike the PBX scenario where a central call processing software controls the access of the phones (terminals) to the common resources (trunk lines), IP networks generally operate without central control. In order to reduce potential collisions between transmissions from different terminals over the common media, the carrier sense multiple access with collision detection (CSMA/CD) control method was developed. The method uses a carrier sensing scheme in which a transmitting station listens on the common carrier before attempting to transmit. If it senses that another terminal is transmitting, it backs off for a random period of time and refrains from transmitting before making another attempt to transmit. In case two (or more) stations collide (due to critical race) the terminals detect the collision, stop transmitting, and wait for a random time interval before trying to transmit again. The CSMA/CD takes advantage of two key elements: a) terminals can sense transmission from any other terminal with which they share the common media, and b) terminals share a short media over which signals traverse almost at the speed of light. Therefore the probability that a terminal starts transmitting at the same time that another terminal starts transmitting (because the two terminals have not sensed the carrier signal from the other terminal) is extremely low.

In satellite communications, on the other hand, multiple mobile users/devices may attempt to exchange messages simultaneously over a shared channel. This is termed multiple access, and may be accomplished with spread-spectrum multiple access techniques, such as code division multiple access (CDMA). Congestion mitigation techniques such as time division multiple access (TDMA) or frequency division multiple access (FDMA) are not always available in satellite communications. In particular, for TDMA, a system with disparate users without a common clock source does not allow synchronization between independent transmitters. Conversely, FDMA requires available frequencies, but many satellite-based communication systems are configured to use all available bandwidth to support more and more users, often limiting or even eliminating the use of FDMA. Further, for a variety of reasons, mobile terminals in a satellite communication network often cannot sense transmission from other terminals. For example, transmission power is directed away from the earth and not detectable by other users that can be entire continent away. Moreover, in satellite communications, the medium that is shared may be a geostationary satellite link which operates over extremely long distances and therefore has hundreds of milliseconds of delay between transmitter and ground station in each direction.

In particular, low power mobile devices or terminals with small antenna apertures, and thus low equivalent isotropically radiated power (EIRP), may attempt to communicate via geostationary satellites. Such a system will generally result in very low received signal power. Additionally, a receiver at the satellite ground station which attempts to receive a signal from a given terminal (via a satellite) may incur further degradation in its signal-to-noise ratios (SNRs) due to signals from other terminals. The signal from other terminals (conveyed via the satellite) may cause co-channel interference (CCI) when other emitters, such as other terminals, transmit at the same time at the same frequency band. In general, as the number of co-transmitters increase, the noise floor at the intended ground station receiver increases resulting in reduced SNR at the receiver. As a result of this CCI, a ground station receiver associated with a specific satellite may be able to support only a limited number of simultaneous terminal transmissions before CCI increases the noise floor to a level that prevents the receiver from being able to decode incoming signals from any terminals rendering the communication channel blocked. If the number of simultaneous emitters exceeds that nominal number, the receiver may fail to properly decode the transmissions from any and/or all mobile devices.

Another limiting condition, other than CCI, is that such communications may be subject to regulatory power spectral density restrictions which may prevent increasing the transmission power of a given terminal. In a specific case of the regulatory restriction, a regulatory specification may place a limit on the number of simultaneous terminal emitters (in a specific frequency band) to prevent transmitters from adversely affecting other users in a given system. If the number of simultaneous emitters exceeds that limit, the associated communication license will be violated, and the operator may be subject to severe penalties. As described above, mobile uncoordinated terminals communicating over satellite links cannot sense transmission by other geographically dispersed mobile devices and as such have no indication that they should refrain from transmission when the regulatory limit is reached.

Still further, in order to ensure proper communication, transmitted messages are typically acknowledged by the receiver. When a transmitting mobile device does not receive a returned acknowledgement from the receiver within a predefined time period, the mobile device may attempt to resend the original message. As such, the attempted retransmission may contribute to even greater congestion at the receiver, and if the number of received transmissions at the receiver exceeds its capacity, it may result in failed reception again. Such failed reception would invoke yet another retransmit attempt that could bring the network down in a process similar to a denial of service (DoS) attack. Unlike the IP network scenario, uncoordinated mobile terminals communicating over satellite links cannot sense transmissions by other geographically dispersed mobile devices, and as such have no indication that they should refrain from transmitting when the communication channel is fully utilized and cannot accommodate another transmission session.

SUMMARY

The techniques described herein relate generally to mitigating any congestion between a ground station server and distributed modules of a multiple-access shared communication media satellite communication system. In certain embodiments, in particular, the ground station server is configured to control the mitigation of forward path congestion, while in other certain embodiments, the ground station server and/or individual distributed modules control the mitigation of return path congestion (notably, regardless of which device initially determines the level of congestion.)

Specifically, according to one or more embodiments of the present disclosure, a communicating device (e.g., either the ground station server or a particular distributed module of the plurality of distributed modules of a multiple-access shared communication media satellite communication system) determines a level of congestion on a particular return communication path via an intermediate satellite. In response to determining that the level of congestion is above a threshold, then the communication device mitigates the congestion. Illustratively, the mitigation by the communicating device may comprise at least one of either:

determining an uncongested return communication path from a particular distributed module to the ground station server, ensuring that the uncongested return communication path would not interfere with any unintended receiver, and then causing the particular distributed module to use the uncongested return communication path; and enforcing one or more communication restrictions on a utilized return communication path to reduce the effect of a communication on the overall congestion of the utilized return communication path.

Other various specific embodiments are described in detail below, and the summary is not meant to be limiting to the present disclosure.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 8A-8C illustrate an example of return path congestion mitigation; and

DESCRIPTION OF EXAMPLE EMBODIMENTS

A communication network is a distributed collection of nodes (e.g., transmitters, receivers, transceivers, etc.) interconnected by communication links and segments for transporting signals or data between the nodes, such as telephony, TV/video, personal computers, workstations, mobile devices, servers, routers, base stations, satellites, or other devices. Many types of communication networks are available, including, but not limited to, computer networks (e.g., local area networks, wide area networks, and so on), communication networks (e.g., cellular networks, broadband networks, etc.), infrastructure or backhaul networks (e.g., C-Band/microwave inter-tower or "point-to-point" (PtP) networks, etc.), and many others.

Figure 1:
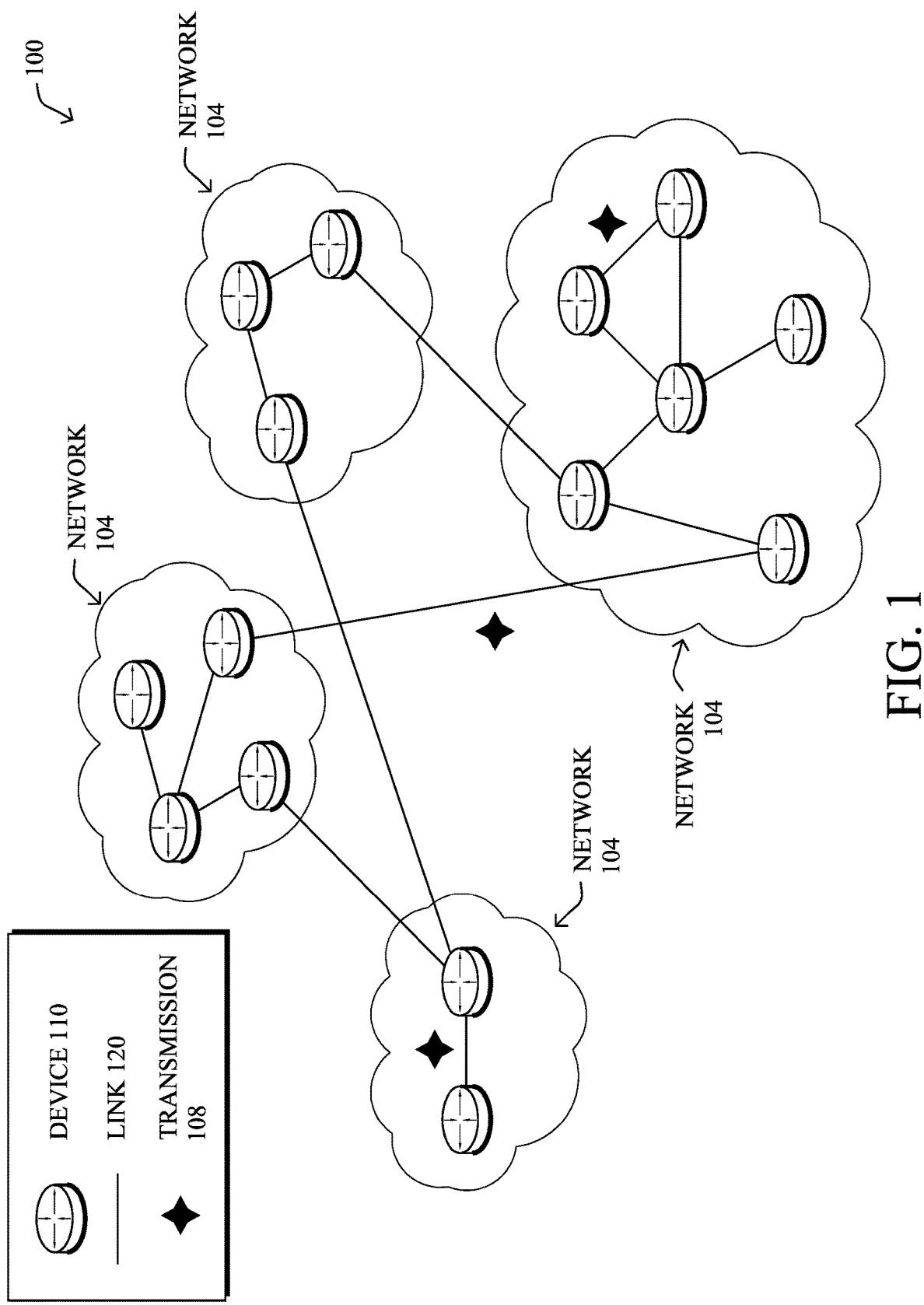
FIG. 1 illustrates an example communications network.

FIG. 1 illustrates an example, and simplified, communications network 100. As shown, one or more individual networks 104 may contain various devices 110 communicating over links 120 specific to the particular network 104, or else between networks. As will be appreciated, networks 104 may include, but are not limited to, local area networks (LANs), wide area networks (WANs), the Internet, cellular networks, infrared networks, microwave networks, satellite networks, or any other form or combination of data network configured to convey data between communicating devices. Networks 104 may include any number of wired or wireless links between the devices, though, as noted herein, the interference techniques herein are generally concerned only with the wireless (or other shared media) links. Example wireless links, therefore, may specifically include, but are not limited to, radio transmission links, near-field-based links, Wi-Fi links, satellite links, cellular links, infrared links, microwave links, optical (light/laser-based) links, combinations thereof, or the like.

Data transmissions 108 (e.g., packets, frames, messages, transmission signals, voice/video/TV/radio signals, etc.) may be exchanged among the nodes/devices of the computer network 100 using predefined communication protocols where appropriate, and such communication may notably be bidirectional or unidirectional. In this context, a protocol consists of a set of rules defining how the nodes interact with each other.

Devices 110 may be any form of electronic device operable to communicate via networks 104. For example, devices 110 may be a desktop computer, a laptop computer, a tablet device, a phone, a smartphone, a wearable electronic device (e.g., a smart watch), a smart television, a set-top device for a television, a specifically designed communication terminal, a satellite phone, a workstation, a sensor/actuator, a vehicle, a drone, an unmanned vehicle, an unmanned aerial vehicle (UAV), other IoT devices, etc.

In one illustrative embodiment, a communication device/terminal may be configured to communicate via satellites (e.g., in the C-band, K-Band, or otherwise) within a satellite communication network/environment. (Note that when in the presence of the incumbent unintended receivers, such as point-to-point receivers, "PtPRs", mechanisms may be defined to prevent interfering with the operations of the incumbent system, such as, for example, as described in commonly-owned, co-pending U.S. patent application Ser. No. 15/379,023 entitled "AVOIDANCE OF INTERFERENCE IN WIRELESS COMMUNICATIONS", filed by Reis et al. on Dec. 14, 2016, the contents of which are hereby incorporated by reference in its entirety.) For instance, a network of earth station terminals may communicate with satellites to provide communication functionality such as, e.g., consumer-based text messaging/light email, voice communication, picture/video communication, and Internet of Things ("IoT") communications, particularly in areas unserved by terrestrial commercial mobile radio services ("CMRS") networks (e.g., cellular or other terrestrial mobile network coverage).

Figure 2:
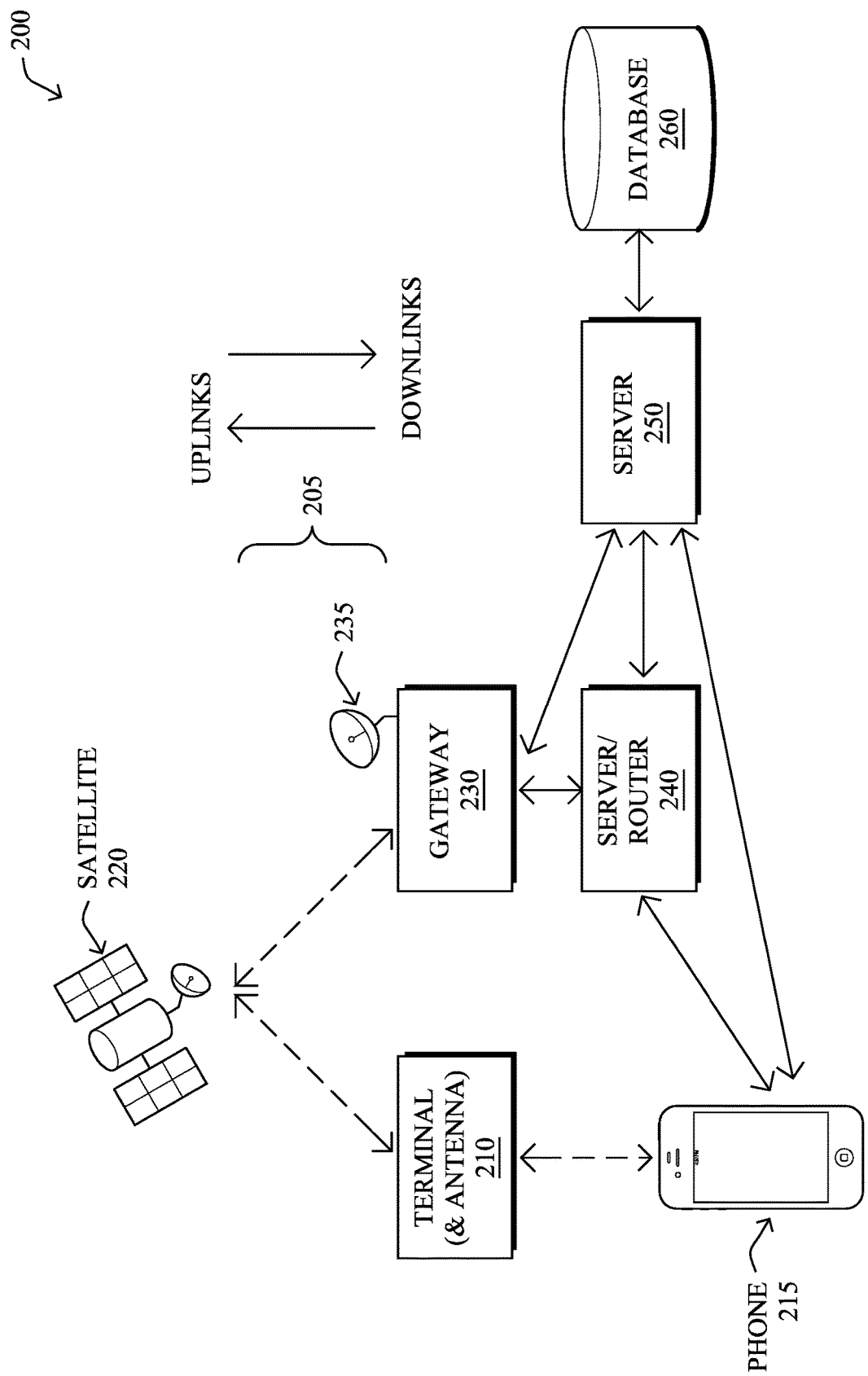
FIG. 2 illustrates an example satellite communications network.

FIG. 2 illustrates an example simplified satellite communications network 200, where one or more communication transmitters 210, which may be mobile or fixed, may be a standalone device, or may be attached to or otherwise associated with another computing device, such as a smartphone 215 or other suitable cooperative device (e.g., laptop, tablet, personal computer, measurement sensors, other types of IoT devices, etc.). Illustratively, the transmitters 210 may be referred to herein as transmitters, terminals, modules, distributed modules, mobile earth terminals (METs), prospective transmitters, etc. According to an illustrative satellite embodiment, the terminals 210 may communicate bi-directionally with conventional (e.g., C-band) geostationary satellites 220, which generally have a known and static location above the earth. (Other non-geostationary satellites, such as low-earth orbit satellites, may be used, and the embodiments herein are not so limited.) A ground station or gateway 230 (or "ground receiver", "ground station receiver", etc.) is an illustrative facility at the other end of the satellite transmission. The ground station 230 may include various computing servers connected to a satellite antenna (e.g., satellite dish 235) pointing at the satellite 220, and thus may be referred to herein as a ground station server (GSS).

Transmissions 205 from the terminal 210 to the satellite are relayed from the satellite 220 to the dish 235 on the ground of the ground station 230. Similarly, the ground station 230 transmits to the terminal 210 by sending radio signals via its dish 235, which transmits it to the satellite 220, which then frequency shifts the frequency of this radio signal and broadcasts it downwards to be received by the terminal 210. As referenced herein, the "downlink" refers to a frequency band that the satellite 220 uses to transmit to the terminals 210 and ground station 230. Conversely, the "uplink" frequency refers to a frequency band that the terminals and ground station use to transmit to the satellite. (Note that the same or different antennas may be used by the various communication devices, e.g., one for uplink, one for downlink, or one for both, and the view and description herein is merely a simplified example for purposes of illustration.) It should be noted that in one illustrative embodiment, the return-path (uplink) frequency band used by the terminals 210 may overlap with frequency bands used by other incumbent receivers (e.g., the PtPRs), and as such may be subject to interference avoidance requirements, as mentioned above. As used herein, the term "forward path" (or "forward link") is used to denote a communication channel that the ground station uses to transmit to mobile terminals via a satellite, while the "return path" (or "return link") terminology refers to a communication channel used by terminals to transmit to a ground station via a satellite.

Notably, though specific implementation embodiments are shown herein with relation to terminals 210 being part of, or associated with, a personal communication device (e.g., for text messaging, short emails, voice communication, etc. from a phone), any number of implementations use the techniques described herein, such as being used for sensors or actuators (e.g., IoT implementations), vehicular control (e.g., drones, robots, unmanned aerial vehicles or "UAVs", etc.), or any other system that uses wireless communication, whether located on land, a waterway (e.g., ocean), or in the air.

With reference still to FIG. 2, satellite communication network may further include one or more routers 240 that may be interconnect the devices, such as terminals 210 (and/or phones 215), gateways/ground stations 230, etc. Routers 240 may be interconnected with such devices over standard communications links, such as cellular, internet, and so on, and may allow further communication by the devices to one or more servers 250, which illustrative have access to one or more databases 260. Those skilled in the art will appreciate that any number of communication links, routers, devices, etc. may be available within the satellite communication network 200, and the simplified view shown herein is for illustrative purposes only. Also, while certain devices are shown separately, various functionality (processing, storage, communication, etc.) may be implemented in any suitable configurations, such as the servers 250 being part of the gateway/ground station 230, the database 260 being part of the servers 250, and so on. Accordingly, the view in FIG. 2 and the associated description is meant as an example, and not meant to limit the scope of the present disclosure.

Figure 3:
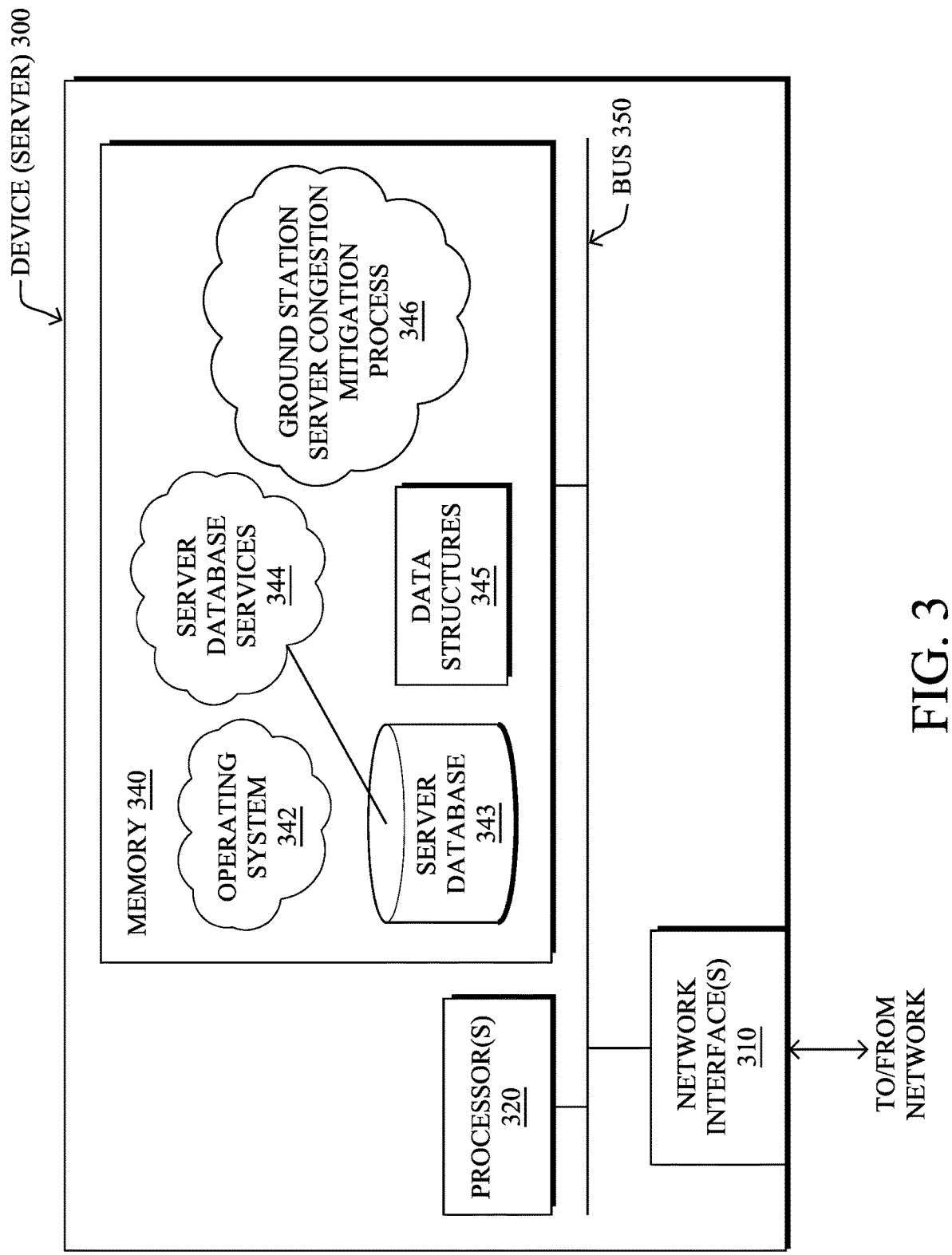
FIG. 3 illustrates an example device configuration, e.g., as a server.

FIG. 3 illustrates a schematic block diagram of an example computing device 300, that may be used with one or more embodiments described herein, e.g., as a ground station/gateway 230, server 250, or other "centralized" device. The device may comprise one or more network interfaces 310 (e.g., wired, wireless, etc.), at least one processor 320, and a memory 340 interconnected by a system bus 350. The network interface(s) 310 contain the mechanical, electrical, and signaling circuitry for communicating data to network(s) 104 and, more particularly, devices 210, 215, 230, etc. The network interfaces may be configured to transmit and/or receive data using a variety of different communication protocols. Note, further, that the nodes/devices may have two or more different types of network connections 310, e.g., wireless, optical, and wired/physical connections, including connectivity to a satellite dish 235, and that the view herein is merely for illustration.

The memory 340 comprises a plurality of storage locations that are addressable by the processor 320 for storing software programs and data structures associated with the embodiments described herein. The processor 320 may comprise hardware elements or hardware logic adapted to execute the software programs and manipulate the data structures 345. An operating system 342, portions of which is typically resident in memory 340 and executed by the processor, functionally organizes the device by, among other things, invoking operations in support of software processes and/or services executing on the device. These software processes and/or services may illustratively include server database services 344 (e.g., controlling server database 343, and/or accessing an external database 260), and an illustrative ground station server congestion mitigation process 346, for performing one or more aspects of the techniques as described herein (e.g., congestion mitigation for satellite communication).

Figure 4:
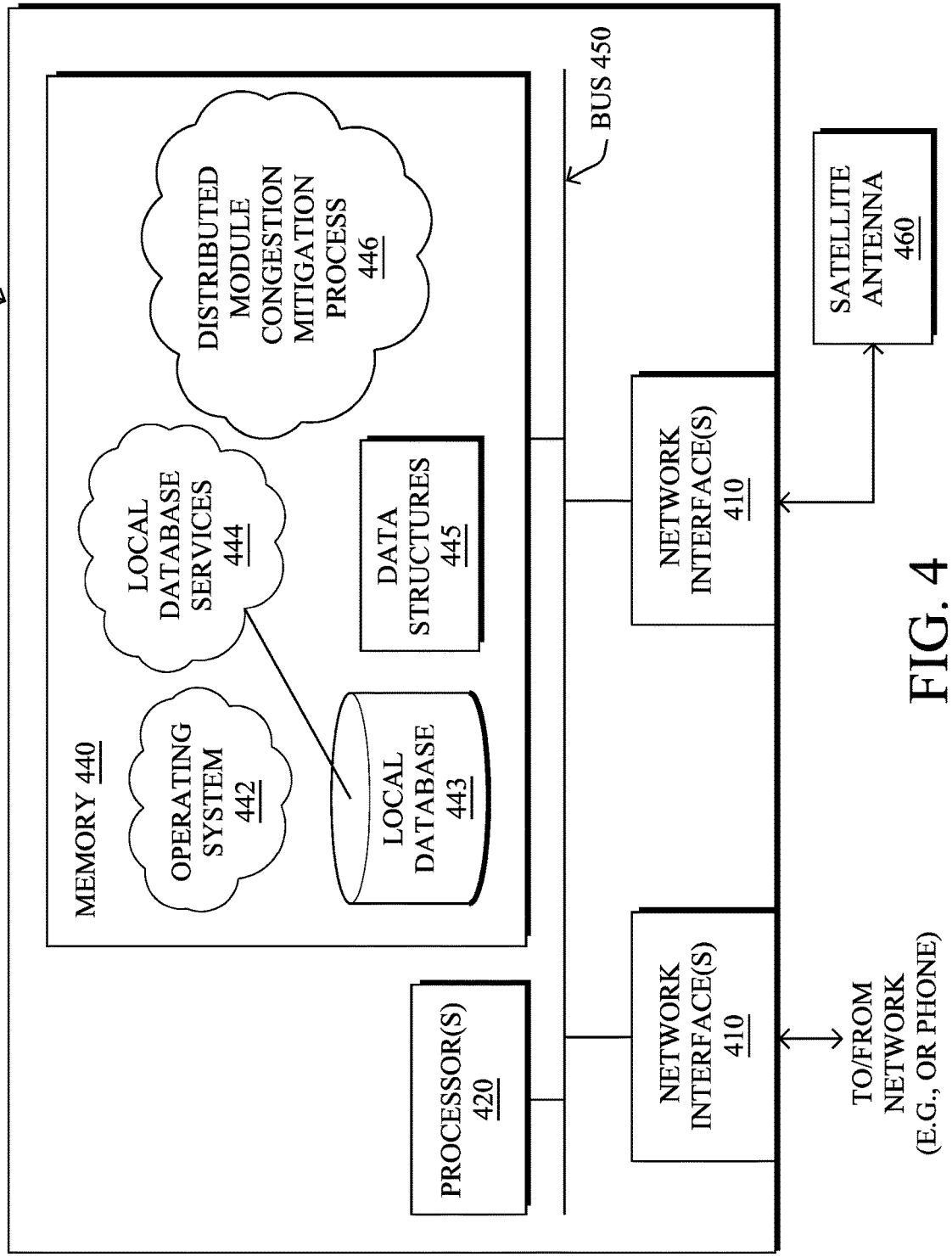
FIG. 4 illustrates another example device configuration, e.g., as a terminal.

Additionally, FIG. 4 illustrates another example device configuration 400, particularly as a terminal/transmitter (or distributed module) 210. Note that the terminal 210 may be embodied as a number of various implementations, such as a smartphone peripheral attachment, a component of a smartphone, a standalone handheld device, a sensor components, IoT, vehicular (e.g., unmanned) components, and so on. For instance, terminal 210 may be an attachment to a mobile phone 215 or other mobile device, where some of the processing occurs on the mobile phone and other portions, such as satellite communication, are performed on the attached (or associated) terminal 210. In accordance with another embodiment, an attachment that contains the terminal circuitry is loosely coupled to a mobile device or to a stationary device. In accordance with yet another embodiment, all of the components of the terminal 210 are integrated into a single embedded (standalone) system. As such, the schematic block diagram of the device 400 is merely meant as an example representation of illustrative components representing a terminal 210 that may communicate within its own network 200 (e.g., satellite system), while being controlled to mitigate congestion, as described herein.

Device 400, a terminal 210 (e.g., transmitting device), may comprise one or more network interfaces 410 (e.g., wired, wireless, etc.), at least one processor 420, and a memory 440 interconnected by a system bus 450. The network interface(s) 410 contain the mechanical, electrical, and signaling circuitry for communicating data to network (s), such as an attached (or otherwise associated) mobile device (e.g., phone) 215 or other associated device, as well as other network communication techniques, such as wired connection to a personal computer or laptop (e.g., a USB connection). One of the network interfaces 410, in particular, is a wireless network interface (e.g., a transmitter/receiver) configured to interface with a local antenna 460 of the device, which, illustratively, may be a C-band antenna (e.g., configured to communicate with a satellite 220), and may comprise various communication front-end components such as amplifiers, filters, digital-to-analog and/or analog-to-digital converters, digital signal processors (DSPs), etc. As mentioned above, network interfaces may be configured to transmit and/or receive data using a variety of different communication protocols, and the device 400 may have different types of network connections, e.g., at least one wireless connection, but also optionally other wireless connections and wired/physical connections, and that the view herein is merely for illustration.

A memory 440 comprises the storage locations that are addressable by the processor 420 for storing software programs and data structures associated with the embodiments described herein, where the processor 420 may comprise hardware elements or hardware logic adapted to execute the software programs and manipulate the data structures 445. An operating system 442, portions of which is typically resident in memory 440 and executed by the processor, functionally organizes the device by, among other things, invoking operations in support of software processes and/or services executing on the device. These software processes and/or services may illustratively include local database services 444 (e.g., maintaining local database 443 itself, or accessing an external database), and an illustrative distributed module congestion mitigation process 446, for performing one or more aspects of the techniques as described herein (e.g., congestion mitigation for satellite communication). Note that in certain embodiments, the terminal device 400 (210) may have limited resources (CPU, memory), and the software processes and/or services of the terminal device may be configured to operate in collaboration with a centralized system device 300 (ground station 230/server 250, described above), and may communicate with the centralized device either via broadband communication such as wireless or wired (e.g., USB), or via a very low data rate satellite link, particularly as described herein.

Illustratively, the techniques described herein may be performed by hardware, software, and/or firmware, such as in accordance with the various processes of device 300 (ground station 230/server 250) and/or device 400 (terminal 210), which may contain computer executable instructions executed by processors 320/420 to perform functions relating to the techniques described herein. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, or on specific devices, those skilled in the art will appreciate that processes may be routines or modules within other processes, and that various processes may comprise functionality split amongst a plurality of different devices (e.g., client/server relationships).

As mentioned above, congestion on a network occurs when a large number of users/devices contend for limited resources. This condition may be particularly prevalent and problematic in satellite communications. Problems specifically associated with congestion in a satellite communication are that the network may become completely blocked against use, or else exceeding some regulatory limit, under high demand. Further, given the fact that satellite communications may be used for emergency situations, it could be potentially disastrous to have unavailable network capacity for emergency messaging.

Figure 5:
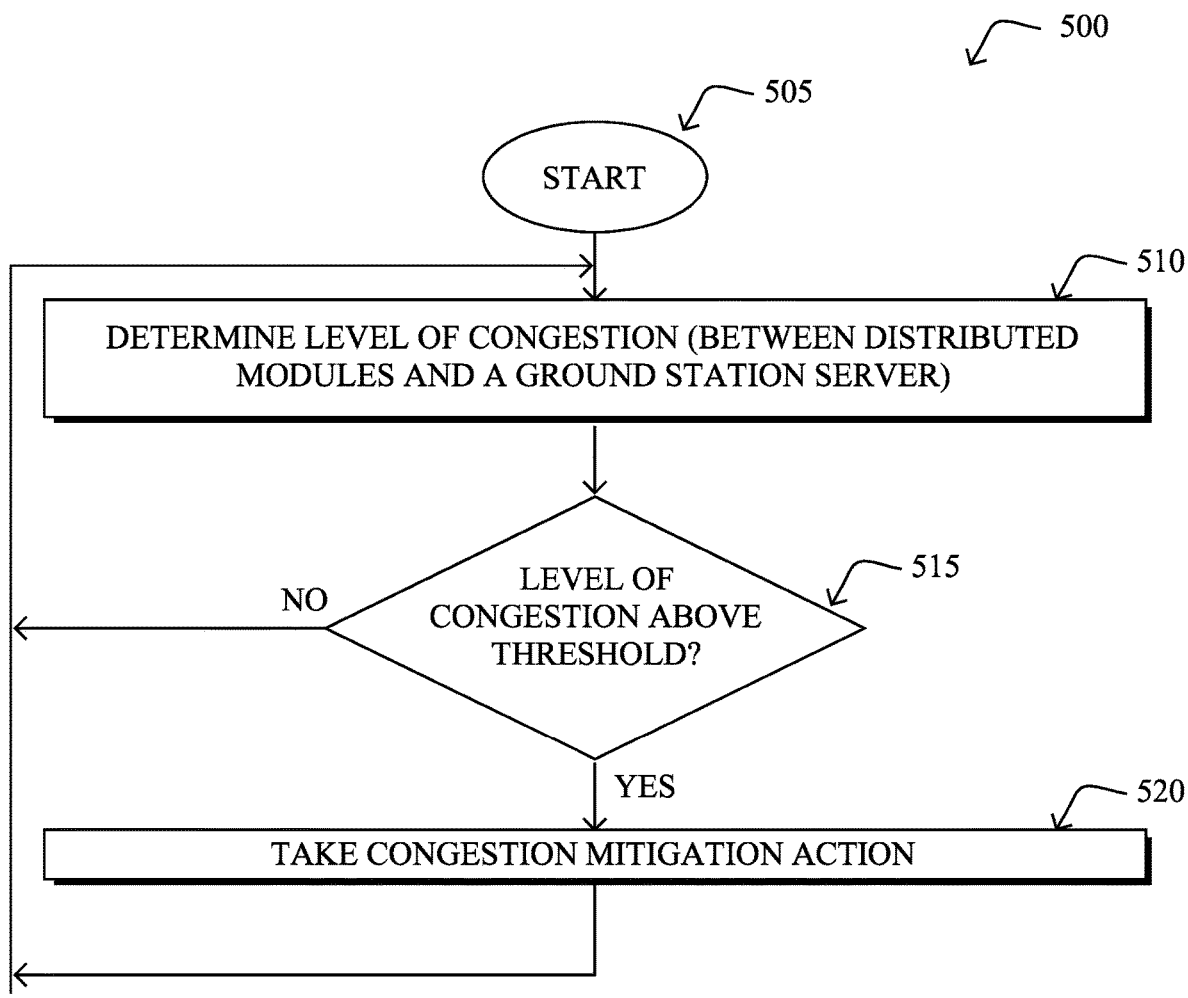
FIG. 5 illustrates an example simplified procedure for mitigating congestion in satellite communications according to one example embodiment herein.

As an up-front illustration of the capabilities of the techniques herein, FIG. 5 shows an example simplified procedure 500 for mitigating congestion in satellite communication networks (or other similar multiple-access shared communication media systems) according to a particular example embodiment herein. (Note that the procedure 500 is meant as an example demonstration of a simplified overview of the techniques herein in order to frame an understanding for the more detailed description below. The steps shown in FIG. 5 are not meant to be limiting to the present disclosure, and additional, fewer, simplified, more complicated, and/or entirely different steps may be performed by the systems herein in accordance with various aspects of the techniques herein.)

In particular, example simplified procedure 500 starts in step 505, and continues to step 510, where a level of congestion (between distributed modules and a ground station server) is determined. If in step 515 the level of congestion is above a given threshold (i.e., is deemed "congested" or some other pre-congested level), then in step 520 one or more mitigation actions may be taken, accordingly. As described in greater detail below, in particular, different techniques may be used depending upon whether the "forward communication path" (or "forward path") is congested or the "return communication path" (or "return path") is congested, and whether the ground station performs the action or the individual terminals/distributed modules performs the action (notably regardless of which device initially determines the level of congestion). (Various combinations, of course, are also possible according to the techniques described below.) Note that in step 515, a single level of congestion may be checked, or else in alternative embodiments herein a comparison for different levels of congestion can be made in order to then take different measures to alleviate congestion at different levels in step 520, as also detailed below.

—Forward Path Congestion Mitigation—

In accordance with one or more embodiments herein, forward path congestion mitigation may first start with a ground station 230 monitoring traffic on its forward path to the terminals/distributed modules 210 to determine load and congestion on the forward path, accordingly.

Figure 6A:
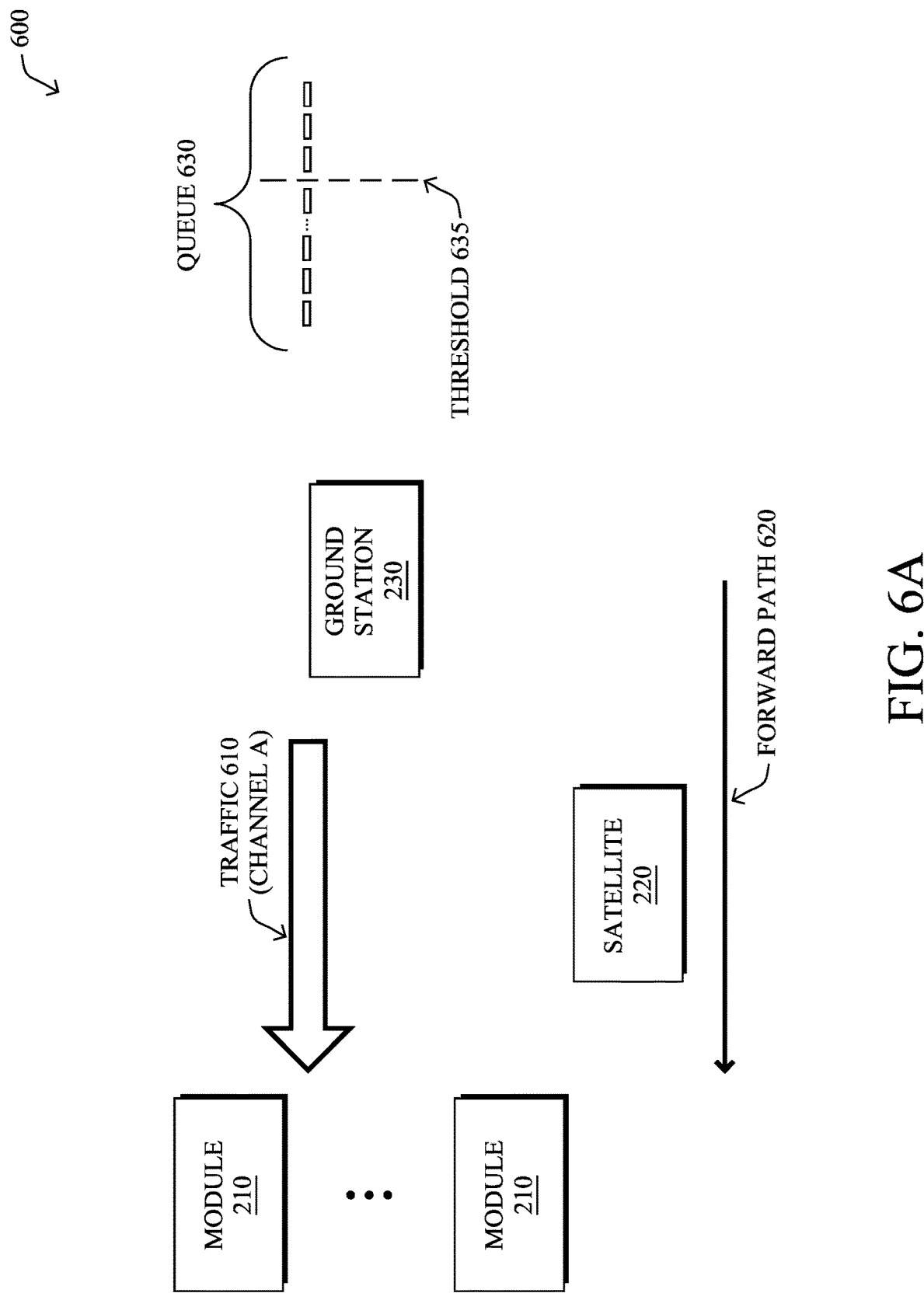
FIGS. 6A-6B illustrate an example of forward path congestion mitigation.

With reference generally to the communication environment 600 of FIG. 6A, modules 210 establish communication with ground station 230 via satellite 220. As part of establishing the communication, modules 210 select a frequency band for communication via satellite 220 with ground station 230. Often, modules 210 cannot communicate directly with each other, and as such cannot coordinate the selection of their communication channel with each other. As such, each module 210 selects its own communication frequency band independent of the other modules 210. In certain embodiments, communications channels may be selected by the respective modules 210 as to avoid interference with any unintended receivers (e.g., incumbent PtPRs, as noted above).

Once the communication path is established using a specific frequency channel (selected by terminal 210), the ground station 230 may send traffic 610 on the forward path 620 (e.g., using channel "A") which may carry both control and information messages that need to be forwarded from the ground station 230 to terminals 210, via satellite 220. (Ground station 230 may have messages intended for module 210 or for a user of module 210.) Message forwarding may be triggered by numerous events such as, e.g., the ground station server receiving a user request for personal messages, sending messages to the terminal automatically upon the terminal connecting to the ground station server (e.g., as soon as the terminal acquires a satellite and establishes a communication channel through it with the ground station 230), forwarding a message to the terminal as soon as the message becomes available (provided the terminal acquired the satellite), and so on.

At any time the ground station 230 knows how many terminals/modules 210 are connected over each forward path as well as the number of messages that it may need to send to these users over the channel (e.g., from message queue 630). Additionally, the size of the messages that need to be sent to the terminals over the channel is known as well. Generally, also, the server at the ground station may assume a typical stream of messages from the terminals and as such may assess the number of acknowledgment messages it may need to send to the terminals as part of queue 630.

Based on this information and the capacity of the particular channel (i.e., the maximum data rate), the ground station server 230 determines whether the level of congestion is above a threshold 635. For instance, in one embodiment the ground station may calculate the time it would take to transmit all of the messages in its queue 630 to each of the associated terminals 210 over a specific channel. In accordance with one particular embodiment, the ground station may compare this time to a threshold and if the time exceeds the threshold then the server will define it to be a congestion condition and take mitigating action to reduce the congestion on the given channel. Illustratively, the threshold may be determined based on usability testing with an attempt to reduce or limit the time that users may need to wait for their messages for no longer than a threshold time duration. Alternatively, the threshold may be based on a set number of messages (e.g., queue depth/length), or other factors. Those skilled in the art should recognize that the above methods are merely for the sake of illustration and other methods may be used to determine the congestion threshold, accordingly.

Figure 6B:
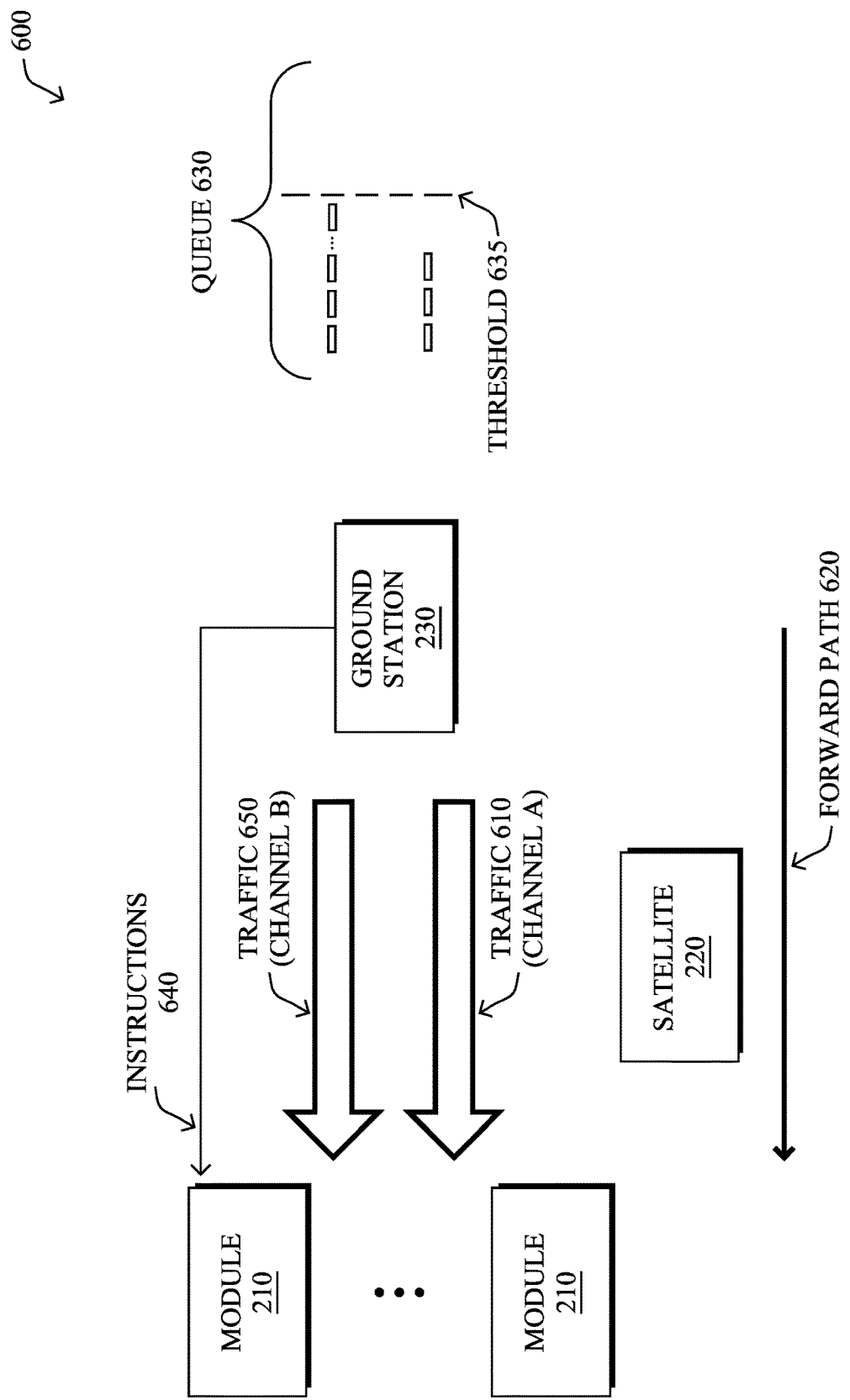

Once congestion (or the onset of congestion) is determined for the forward communication path 620 (on a particular channel), then in accordance with the techniques herein, ground station 230 (ground station server 230, server 250 at the ground station 230, etc.) invokes a mitigation process. Illustrative aspects of an example mitigation process may comprise one or more of the following steps, with reference generally to FIG. 6B:

1. Determine the size of the respective messages that need to be forwarded to the various terminals and identify the longest messages. (Estimate near-term loading).
2. Estimate the number of acknowledgment (ACK) messages that may need to be sent.
3. If the sending time is longer than the threshold, determine what portion of the messages (e.g., how many of the long messages) may need to be moved to an alternate channel as to reduce the size of the transmission queue 630 to a size that could be transmitted in period of time shorter than the time-period threshold. (Dynamic load balancing.)
4. Identify the terminals to which these particular messages are intended.
5. Identify alternate channels that could be used to transmit the respective messages to the intended terminals, and determine if sending the message over these alternate channels would cause a congestion condition on the channel. (Notably, the process of selecting an alternate channel may include identifying frequency channels that module 210 can use without interfering with any incumbent PtPR.)
6. If the system can identify such an alternate channel, the server at the ground station issues guidance to the receiver of the mobile terminal to tune its receiver to the new channel (instructions 640). (Note that in certain embodiments, forward and return path channels are paired, thus is may be necessary to ensure that the corresponding return path is also available for use by the terminal).
7. The process repeats until all of the messages that could be moved to other forward channels are moved to the respective new channels (without causing a congestion condition there), such as traffic 650 on channel "B".
8. The process ends when the length of the queue 630 is reduced to a size that is below the threshold 635 (e.g., that can be transmitted in a period of time below the threshold), or when the system cannot move messages to other forward channels without causing congestion condition there. Those skilled in the art will recognize that the process of transitioning a module 210 from working on channel A to operate over channel B may require a message exchange which could add to the load of the congested traffic. Therefore, the process herein may consider only those modules 210 that have a substantial amount of information waiting for delivery in queue 630. (This implies that only those modules with either very long messages in the queue or numerous shorter messages that in aggregate amount to a large amount of information.)

It should be noted that the process outlined above may illustratively start by focusing on the longest messages first as to reduce the number of messages that would be marked for transmission over an alternate channel (and as such reduce the number of terminals that would need to be instructed/guided to move to a different channel). This is beneficial in order to reduce the control traffic 640 where the server instructs the mobile terminals to tune to an alternate channel. In accordance with another embodiment, especially when all channels are operating close to the congestion level, the method may start with shorter messages (as to move them to another transmission queue in an alternate channel without triggering congestion at that second channel). In yet another example embodiment, messages may be considered for moving to an alternate queue in the order that would shorten the time it would take to deliver them to the intended mobile user's terminal. The order by which messages are considered for moving to alternate channels are thus mentioned herein only for the purpose of illustration, and the techniques herein also cover any other order for considering messages to be moved to an alternate channel.

It should be noted that for simplicity, the process above is described as having a single queue 630. Those skilled in the art, however, would recognize that systems usually manage a plurality of queues, each one dedicated to a different level of priority. As such, high-priority queues may have a different (e.g., lower) threshold 635 for prompting the invocation of a congestion process for that queue based on a lower estimated time delay for the high-priority messages.

As mentioned above, in the case that the forward and return channels are assigned separately, the process can work as described above. However, when the forward and return paths are connected/paired, before deciding on moving a specific terminal to a new channel, the server may first ensure that the terminal can use the new channel on the return path without interfering with any incumbent terminal or other unintended receiver.

Figure 7:
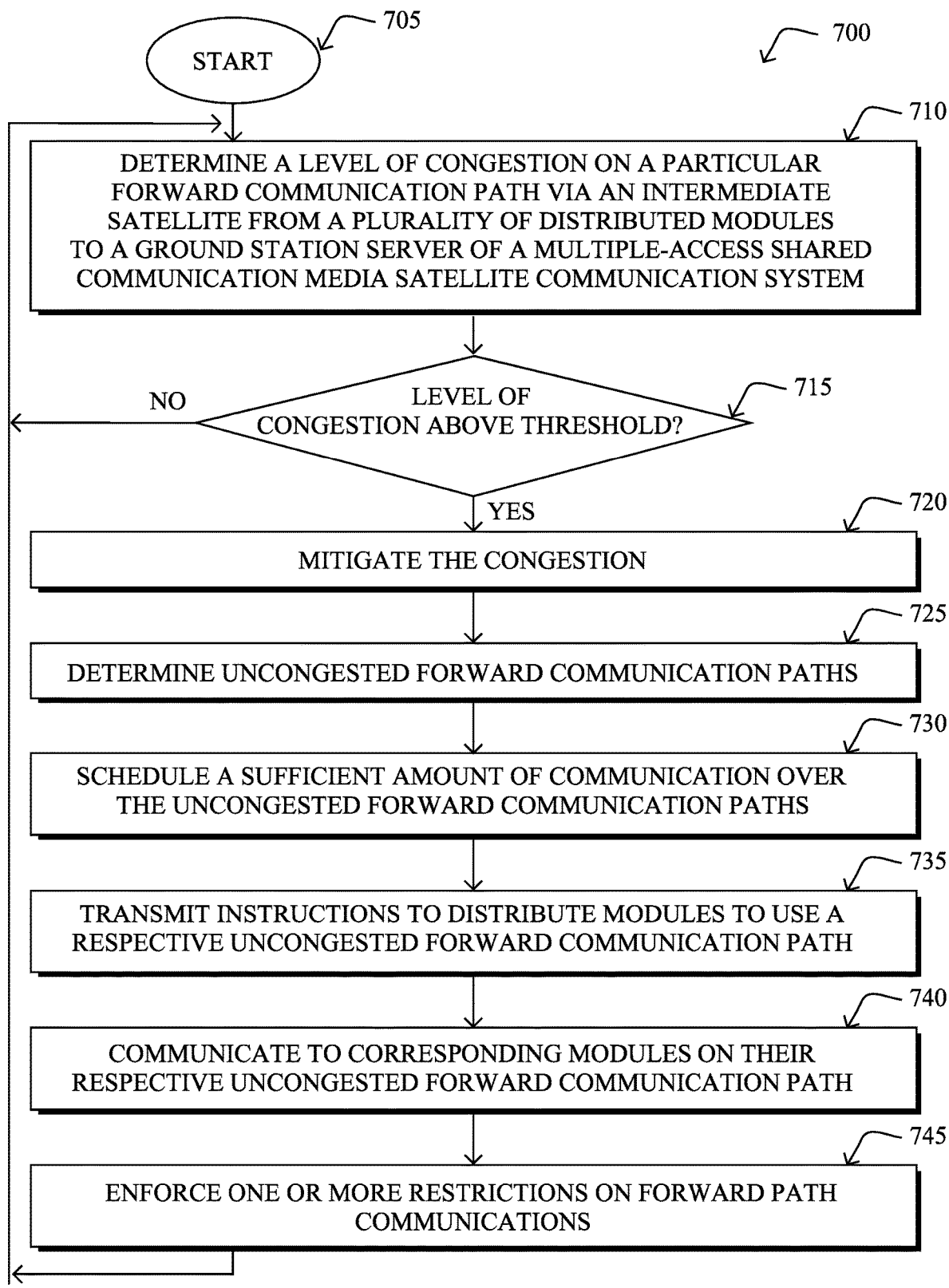
FIG. 7 illustrates an example simplified procedure for forward path congestion mitigation.

FIG. 7, in particular, illustrates an example procedure for forward path congestion mitigation in accordance with one or more embodiments described herein. For example, one or more non-generic, specifically configured devices (e.g., particularly ground station server 230/300) may perform procedure 700 by executing stored instructions. The procedure may start at step 705, and continues to step 710, where, as described in greater detail above, a process (e.g., within a ground station server of a multiple-access shared communication media satellite communication system) determines a level of congestion on a particular forward communication path via an intermediate satellite 220 from the ground station server 230 to a plurality of distributed modules (terminals) 210. As described above, determining the level of congestion may be based on a number and size of all messages the ground station server is scheduled to send to the distributed modules within a given moment of time (i.e., within queue 630), which may also include any acknowledgment messages from the ground station server. Alternatively, the level of congestion may be based on a number of unacknowledged messages sent from the ground station server (indicating either trouble of the terminals to receive the messages, or trouble of the terminals to return the acknowledgments on the return path, as described below). Note that in one additional or alternative embodiment, historical information about communication patterns of the particular forward communication path may be used to determine an expected level of congestion at a given time (e.g., historically heavy communication times), such that mitigating the congestion is to mitigate against expected congestion, accordingly.

In step 715, the ground station server may then determine whether the level of congestion is above a threshold 635 (e.g., determining congestion exists in response to an estimated transmission time to transmit all of the messages being greater than a particular threshold length of time). Note that in certain embodiments, the level of congestion and associated threshold may assume a reserved bandwidth for emergency communications, ensuring that non-emergency communication never exceeds an amount on a given channel that would prevent emergency communication from occurring.

If there is congestion (above the threshold), then in step 720 the ground station server commences mitigation, such as specifically shown in illustrative steps 725-745. For example, according to one example embodiment, mitigation may start in step 725, where one or more uncongested forward communication paths are first determined from the ground station server to the plurality of distributed modules. Note that as described above, when forward and return communication path channels are paired in the satellite communication system, this step may include determining whether a particular channel (which may include different frequency channels for the forward and return paths) can be used by a specific module 210 for both forward and return communication paths before using the particular channel. (For instance, the step may involve determining that the particular channel can be used for both forward and return communication paths based on the particular channel not interfering with unintended receivers for the forward and return communication paths by a specific module).

Mitigation may then proceed to step 730, where a sufficient amount of communication to a specific module 210 may be scheduled over the one or more uncongested forward communication paths to alleviate congestion on the particular forward communication path, notably without congesting the one or more uncongested forward communication paths and, illustratively, while ensuring that the paired return channel (if any) does not interfere with any incumbent PtPR. As mentioned above, in one embodiment larger communications may be scheduled over the one or more uncongested forward communication paths prior to scheduling comparatively smaller communications, while in an alternative embodiment smaller communications may be scheduled over the one or more uncongested forward communication paths prior to scheduling comparatively larger communications. In particular, in certain embodiments, the techniques herein may ensure that the size of the communication that is targeted to move to another channel is larger (or smaller) than a predetermined size, where the predetermined size is based additionally on the overhead required to move a terminal to an alternate communications channel. In still another embodiment, communications may be scheduled over the one or more uncongested forward communication paths such that a given set of communications are transmitted over the one or more uncongested forward communication paths and over the particular forward communication path in a shortest possible time to transmit the given set of communications to the modules.

In step 735, the ground station server may instruct one or more corresponding modules of the plurality of distributed modules, where the instructions cause the one or more corresponding modules to use a respective uncongested forward communication path of the one or more uncongested forward communication paths, as described above. Note that the instructions may cause certain of the one or more corresponding modules to switch from a currently used forward communication path to the respective uncongested forward communication path, while other modules may be instructed to use an uncongested forward communication path for new/upcoming communications. (Also, as described in greater detail below, the instructions may further cause the plurality of distributed modules to adaptively adjust an acknowledgment timeout period for retransmitting communications corresponding to the level of congestion on the forward communication path.)

Accordingly, the ground station 230 may communicate to the one or more corresponding modules 210 on their respective uncongested forward communication path in step 740. (Optionally, in step 745, one or more restrictions may be enforced on forward path communications, such as, e.g., limiting message length, limiting a number of messages to send to a terminal, transmitting high-priority communications before or otherwise in favor of (e.g., with a lower threshold for time delay than) low-priority communications, transmitting only high-priority communications, and so on).

The illustrative procedure 700 may then repeat to monitor the communication channels for congestion, and mitigate the congestion, accordingly.

—Return Path Congestion Mitigation—

Figure 8A:
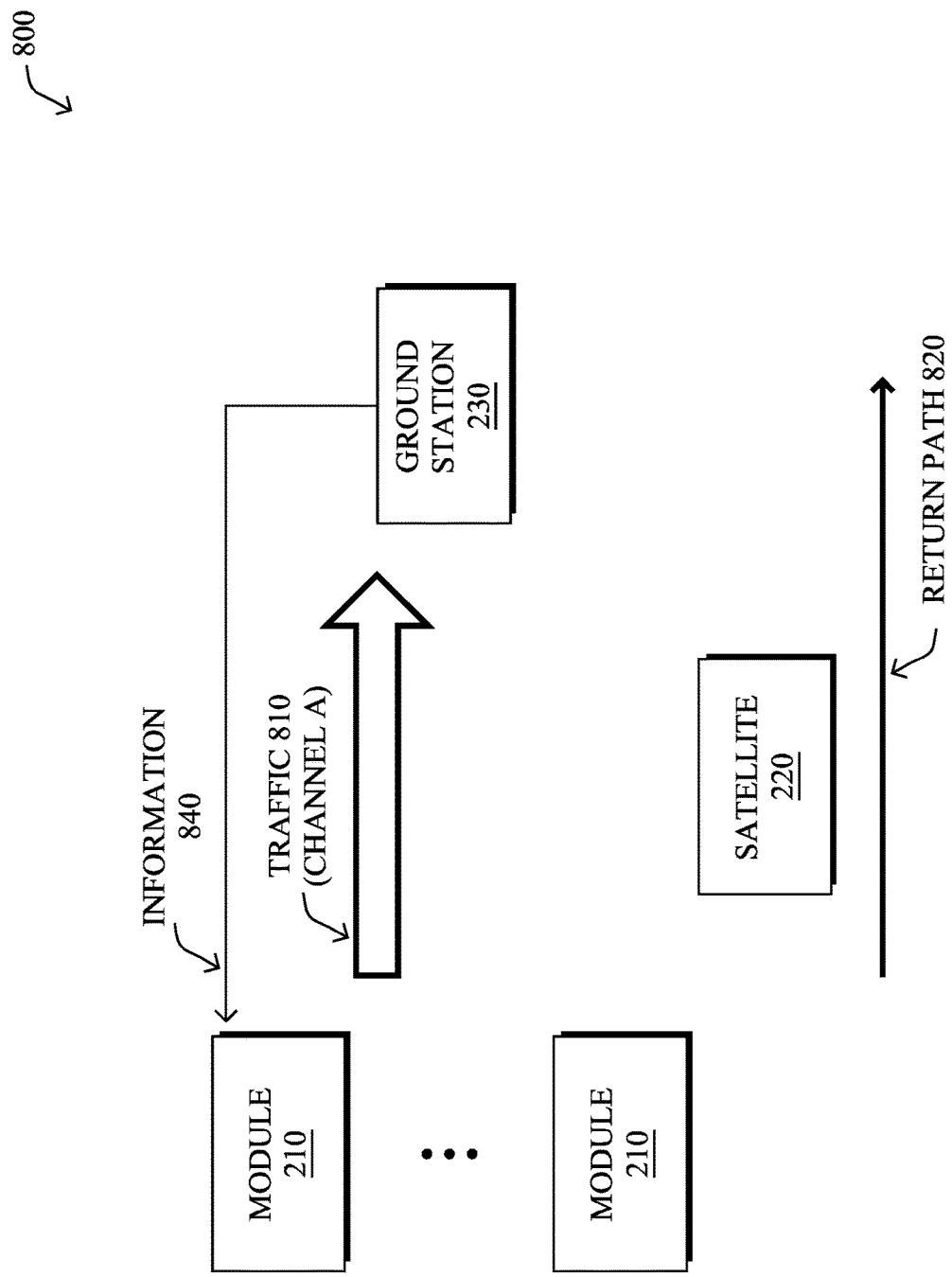

In accordance with one or more additional embodiments herein, return path congestion mitigation may be performed by one or both of either the ground station 230 or the terminals/distributed modules 210. In particular, and with reference generally to the communication environment 800 of FIG. 8A, traffic 810 on the return path 820 (e.g., using channel "A") may consist of both control and information messages that terminals 210 send via the satellite 220 to the ground station 230 and/or to other users 210 (also via the satellite). (In some embodiments, however, dedicated forward path channels may be used for sending specific control information such as return path (and forward path) congestion information.) Ground stations also generate broadcast packets when there is no data to send to terminals. This condition arises when there are no active connections or when there are active connections but protocols dictate that the ground station must wait for acknowledgment messages before sending more data. This may include users of the same satellite network or users associated with another communication networks. It should be noted, however, that under certain circumstances, the ground station may interleave broadcast messages with messages to a specific module 210. For example, a broadcast message may be sent at least every 10 seconds. Because of the geographic diversity of mobile terminal users, as well as the low power they transmit, the direction in which the antenna of the mobile device is aimed towards the satellite, terminals are not generally aware of other terminals that may be using or attempting to use the same return path communication channel. As a result, during peak usage time, network capacity may be exceeded and the channel may become blocked, or the network may deteriorate to the point of not being useful (become flooded).

In accordance with one particular embodiment herein, the server in the ground station 230 monitors the number of terminals/modules 210 that are using each specific communication channel and may calculate the usage as a percent of the total capacity of each specific communication channel. The ground station may then broadcast the occupancy of the channel via a specific broadcast transmission over the satellite to all of the mobile terminals.

It should be noted that for a geostationary satellite that is placed at an altitude of approximately 35,800 kilometers (22,300 miles) directly over the equator, the travel time of a signal is about 0.239 seconds round trip time (RTT) for terminals located on the equator just below the satellite. For other places it may be somewhat longer, but for the sake of simplicity assume a RTT of 0.25 second. As such, the information conveyed to the mobile terminals is "stale" by about 0.25 seconds. For comparison purposes, it should be noted that for an IP network over a coaxial cable, an electrical signal travels at a speed slightly slower than the speed of light at about 200,000 kilometers per second. This implies that if two terminals that are located one kilometer apart are attached to a coax cable, a terminal will become aware of transmission from the other terminal about 5 microseconds after the other terminal started transmitting over that cable. Those skilled in the art will thus appreciate that the window of uncertainty about the network condition (such as usage by other terminals) is much greater for a satellite-based system as compared with an IP network. However, unlike an IP network that can accommodate only a single transmission over the medium (such as coax cable), a satellite channel can accommodate numerous (e.g., 100 or more) simultaneous transmissions (from different terminals) over the same return path. To this end, broadcasting of channel usage information over a forward channel, even though it might be somewhat stale, can still be used to control and alleviate congestion on a return path using a method described below.

In accordance with another embodiment each terminal monitors the traffic on the forward path between the satellite and the multiple ground terminals. Existing terminals decode all of the forward path messages and check the address or ID of the intended recipient to determine whether they are the intended recipient of each specific message. This is done by decoding the message and examining the intended recipient field. If the message is intended for the terminal itself, the terminal receives and processes the message for the intended user. If the message is for any other terminal, the terminal drops/ignores the message. In accordance with this embodiment, however, a terminal processes all of the forward path messages, where messages destined for other terminals may be monitored (e.g., maintained in a table) to determine a set of terminals that are concurrently using the channel. An illustrative table may include information such as:

The user ID of concurrent terminals/users;
The time of the last message/packet received for this terminal/user;
The type of messages received for this terminal/user (e.g., ACK messages to new terminals acquiring satellite signals, instructions to move to other channels, etc.);
A count of packets received for this terminal/user;
And so on.

The terminal may order the table by time of last packet received, so that if/when there is more activity than can be represented in the table, older entries may be "aged out" of the table. Generally, it should be understood that there could be a large number of active users having interleaved data over some period of time (e.g., the last 10 seconds), or a small number of users exhibiting a large packet count over the same period of time. The terminal 210 then uses the pattern of the forward path traffic to infer the traffic load on the return path and the available/unused bandwidth.

Terminals 210 may also count the number of broadcast (timestamp) messages received within a fixed window of time. For instance, since ground stations may generate broadcast messages when there is no user data to transmit, the presence of broadcast messages, and the ratio of broadcast messages to non-broadcast messages, may imply available bandwidth (available channel utilization). (Note that the number of users may be low, and as such, if the broadcast message count is also low, then it is possible that the users are demanding high channel utilization over the monitored window of time.) This ratio (broadcast to non-broadcast) may also be weighted differently in the decision model for determining a level of congestion.

The terminal/distributed module 210 now has three data points by which it can determine channel loading for a return channel:

The concurrent terminal/user count as measured over a recent window of time;

The type of messages sent to specific terminal, e.g., ack message, control message, data message, etc.; and The approximate amount of unallocated bandwidth.

The terminal may then use this information to infer the aggregate traffic load on the return path. For example, if a terminal detects that the satellite sent in the last e.g., 10 seconds, messages to twenty users, it may infer that at least twenty users are currently active on a specific channel. Alternately, if there were five users but few or no broadcast messages within the last 10 seconds, the terminal may infer that there are five active users, each of whom is using significant channel bandwidth. In still another embodiment, the broadcast messages generated by the ground station may contain an indication or "hint" to counts of terminals (e.g., the number of users concurrently engaged on a particular channel, or that have been within a recent period of time, e.g., two seconds).

According to the illustrative embodiments above, therefore, conditions indicating favorable channel availability (from the perspective of a terminal/distributed module 210) may be few or no users, or a large ratio of broadcasts to non-broadcast messages within the recent time window. As such, prior to attempting to transmit a message on a given channel, a terminal may use any of the methods described above, or a combination of them, to estimate the number of users on a given channel and more importantly to estimate the percentage of this specific channel utilization/occupancy. (Though not specifically described, those skilled in the art should recognize that the above mentioned favorable channel may be selected from a set of channels that have first been identified by the module 210 to not interfere with any unintended/incumbent receiver (e.g., PtPR) in the vicinity of the module 210.)

In accordance with yet another embodiment herein, the ground station may be responsible for providing to the terminal with near real-time information 840 regarding the availability and congestion of each return and forward path channel. The terminal uses this information for optimized return path selection (in addition to the location/pointing results, if necessary, to aim at the appropriate satellite), and for optimizing forward path selection. The information provided by the gateway is termed "congestion indices" for the forward and return path, and indicate the overall availability and the relative availability of each return and forward path channel at an instant in time.

For example, an illustrative terminal may use a primary forward path sync channel to acquire the signal and lock with the satellite (satellite acquisition). This channel may provide highly compressed, instantaneous congestion information to the terminal. There may be a separate primary forward path sync channel for each satellite. Keeping the primary sync channel to a smaller size (e.g., a single protocol data unit (PDU)) is important for performance to minimize the sync time at the terminal.

In an alternate embodiment, each satellite may provide congestion information about the entire set of forward and return paths over all prospective satellites, thus enabling the terminal to select the least utilized paths.

Figure 8B:
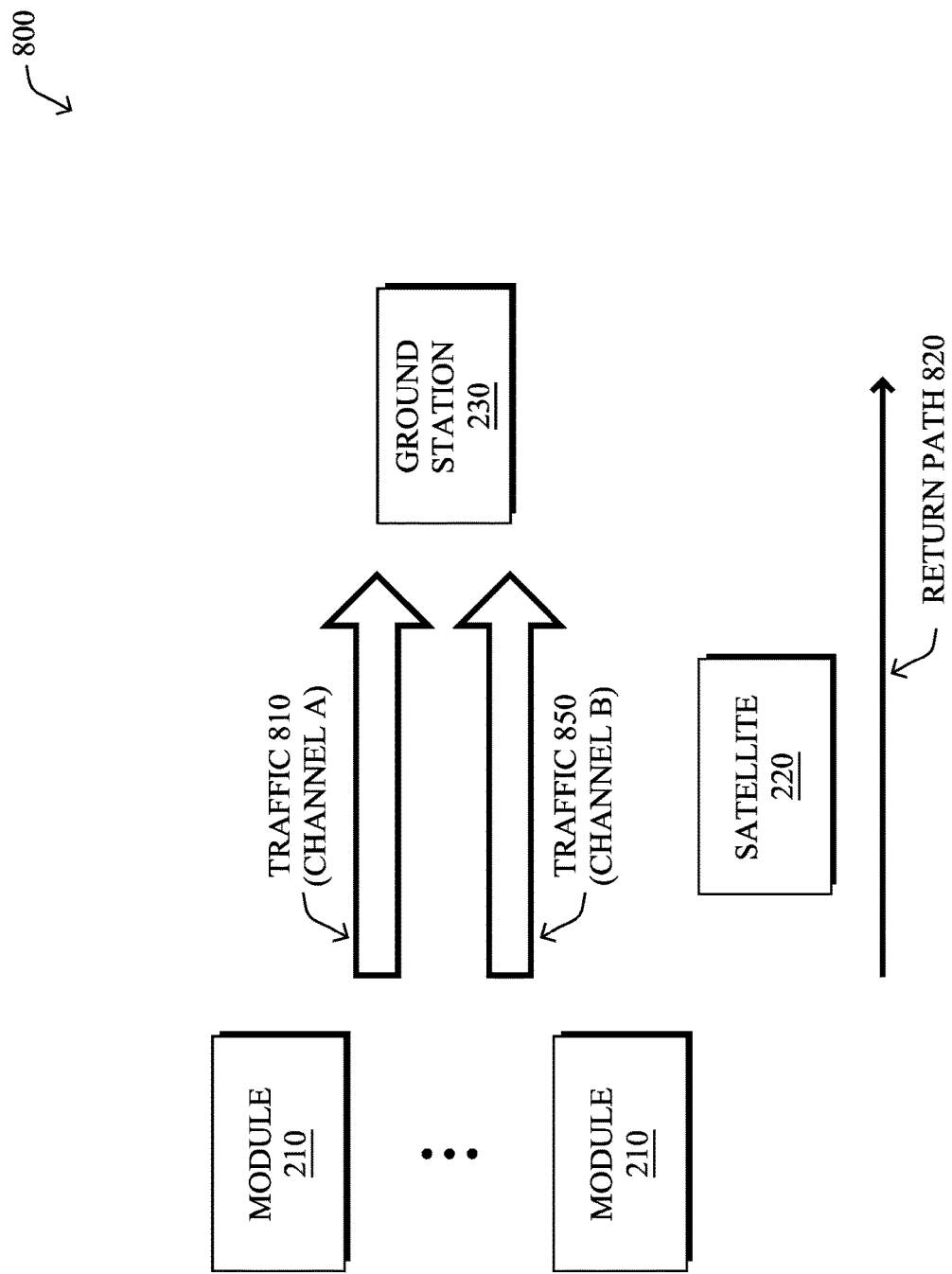

Regarding mitigation of any congestion on a return path, in accordance with one or more embodiments herein, a terminal 210 may first determine which satellite and what channels over this satellite can be used (e.g., without causing any interference with an incumbent receiver, as noted above). The terminal may then determine which of these available return channels is utilized lightly, or the least, and proceeds to use that return path channel to send messages. For example, as shown in FIG. 8B, a terminal may determine that it operates under a low channel utilization when it determines that the channel utilization for channel "B" is below a congestion threshold, and as such, decides to send its traffic 850 over channel B, accordingly. Alternatively or in addition, as shown in FIG. 8C, various restrictions (restricted traffic 860) may be imposed on the traffic in order to maintain a non-congested level for a given return path.

Notably, according to one or more embodiments herein, different levels of congestion may be considered and mitigated/restricted accordingly. For instance, when the terminal detects medium channel utilization, it may inform an associated user of this condition and may impose some restrictions on the use of this specific channel. These restrictions may include limiting the length of messages users may send (e.g., messages no longer than 40 characters), request that the terminal move to use another satellite (if the other satellite is available and is under lower load), etc. The terminal may determine that it operates under a medium channel utilization when it detects that the channel utilization is above a first threshold, e.g., above 60% utilization, but below a second threshold, e.g., below 80% utilization.

When the terminal detects high channel utilization, it may inform the user of this condition, and may impose stricter restrictions on the use of the terminal over this specific channel. These restrictions may include allowing use of the terminal only for an emergency situation, restricting the user from addressing messages to generic users and facilitating only messages to emergency services such as the Coast Guard, search and rescue personnel, park rangers, etc. In a specific case, the system may restrict the messages to sending only the GPS location of the terminal and a canned emergency message (e.g., an "SOS" message). In other cases, a more detailed message may be allowed to be authored and sent but only to an emergency service provider. The terminal may determine that it operates under a high channel utilization when it detects that the channel utilization is above a second threshold, e.g., above 80% utilization.

Those skilled in the art should recognize that the restrictions and threshold levels described above are provided for illustration purposes only and other restrictions and threshold levels that may be imposed are covered by the embodiments herein as well.

A terminal that operates under high or medium channel utilization conditions may continuously monitor the load of the network. If the load on the network increases, e.g., from low to medium or from medium to high, the terminal may take an immediate action and modifies its behavior to comply with the requirements of the new network condition. On the other hand, if the network load lessens, e.g., decreases from high to medium or from medium to low load, the terminal may transition (e.g., gradually) to operate under the new condition. A gradual transition may be performed to prevent a large number of terminals from beginning to transmit on the return path simultaneously causing the network to degrade. Specifically, in accordance with one embodiment, when a terminal detects that the load on the network decreased to a lower level of utilization, it may select a random number N and multiply it by the RTT (round trip time). The terminal then waits, e.g., for N*RTT seconds, before reevaluating congestion and potentially modifying its behavior to take advantage of the improved (lower) network congestion (where the number N*RTT is presented for illustration purposes only and other numbers can be used).

In yet another aspect of the techniques herein, when a terminal transmits a message via a satellite towards a server in the ground station, it may wait for a pre-defined/nominal time for acknowledgement from the server. If the acknowledgement is not received within this nominal time, the terminal may retransmit the message to the server over the return path channel. Under a high load the server may be slow to respond either because of the overall increased processing demand and/or because of the fact that the forward channel may be busy transmitting messages to the various terminals on the forward path. If the terminal retransmits the message because the acknowledgement was slow to come, it may increase the load on a highly utilized network thus further increasing the load. Simply increasing the timeout to account for the delay in acknowledgement under high load would work, however it would also penalize the user who operates under low load. If a message gets corrupted (under low channel utilization), the user would need to wait for a long time before his terminal times out and retransmits the message. To mitigate this issue, a system in accordance with the techniques herein may utilize an adaptive time-out delay for the acknowledgement message from the ground station server. In particular, under low load conditions (as defined above) the terminal may use a short time-out threshold. Accordingly the terminal would expect an acknowledgement message to arrive shortly after it sends a message. If an acknowledgment is not promptly received, the terminal would time-out and then resend the message. However, as the terminal detects higher channel utilization, it may adaptively increase the time-out threshold and waits for a longer period of time before resending the message. Thus, the terminal allows the busy (and slow) system sufficient time to decode the message, process it, and acknowledge over the busy channel, receipt of the uplink message from the terminal.

Figure 9:
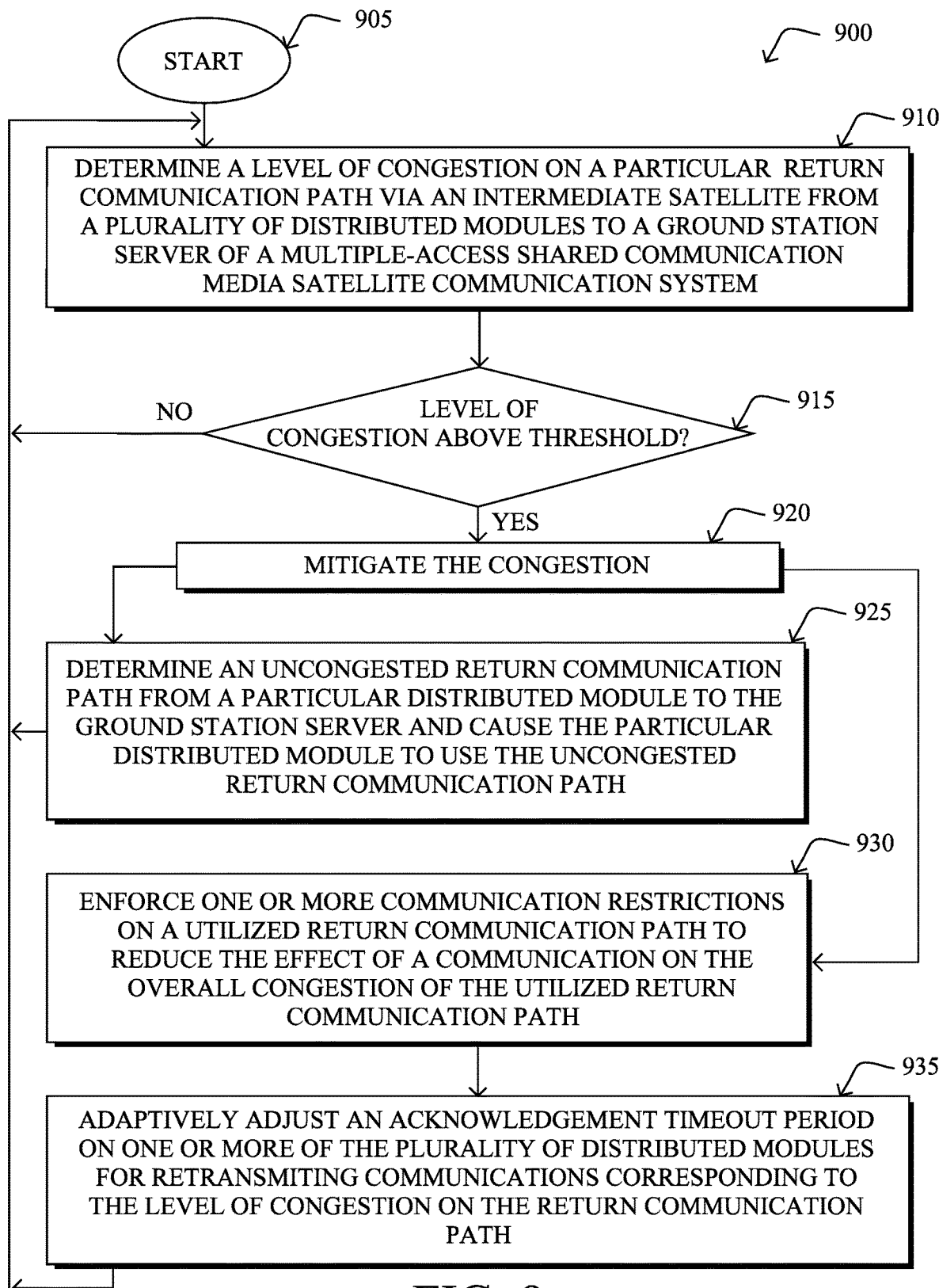
FIG. 9 illustrates an example simplified procedure for return path congestion mitigation.

FIG. 9 illustrates an example procedure for return path congestion mitigation in accordance with one or more embodiments described herein. For example, one or more non-generic, specifically configured devices (e.g., a ground station server 230/300 and/or terminals/distributed modules 210/400) may perform procedure 900 by executing stored instructions. The procedure may start at step 905, and continues to step 910, where, as described in greater detail above, a process (e.g., within either type of noted communicating device of a multiple-access shared communication media satellite communication system) determines a level of congestion on a particular return communication path via an intermediate satellite 220 from a plurality of distributed modules (terminals) 210 to a ground station server 230.

As detailed above, determining the level of congestion may be estimated based on an amount of aggregate traffic the plurality of distributed modules are transmitting to the ground station server within a given time period. In one embodiment, the amount of estimated aggregate traffic is determined by the ground station server, and the ground station server may then send, to the plurality of distributed modules (e.g., information broadcast from the ground station server), the level of congestion, the amount of aggregate traffic, and/or explicit instructions to cause particular distributed modules to use an uncongested return communication path or to impose traffic restrictions. Alternatively, the amount of estimated aggregate traffic may be determined by each (or a) particular distributed module by listening to and tracking all active communication from the ground station server to the plurality of distributed modules as described above. That is, particularly when the distributed modules are unable to listen to communication from each other (e.g., at least one of the plurality of distributed modules), then the distributed modules may infer communication from the other distributed modules based on the active communication from the ground station server to the at least one of the plurality of distributed modules (e.g., listening to and tracking all messages and/or acknowledgment messages from the ground station server to the plurality of distributed modules).

As also described above, the amount of aggregate traffic may be estimated based on a number of the plurality of distributed modules communicating at a given time, a number of packets being sent at a given time, and so on, such that the level of congestion may be respectively estimated based on a proportion of the number of the plurality of distributed modules communicating compared to a maximum number of distributed modules allowed to communicate at the given time, a proportion of the number of packets being sent compared to a maximum number of packets allowed to be sent at the given time, and so on, accordingly. Note again that in one additional or alternative embodiment, historical information about communication patterns of the particular return communication path may be used to estimate an expected level of congestion at a given time (e.g., historically heavy communication times), such that mitigating the congestion is to mitigate against expected congestion.

In step 915, the communicating device determines whether the level of congestion is above a threshold (e.g., assuming again a reserved bandwidth for emergency communications), where in step 920, in response to the level of congestion being above the threshold, the device may invoke mitigation for the congestion. As detailed above, mitigating may be in the form of either (or both of) step 925 or 930. In particular, in step 925, mitigation comprises determining an uncongested return communication path from a particular distributed module to the ground station server, optionally ensuring that the uncongested return communication path would not interfere with any unintended receiver, and then causing the particular distributed module to use the uncongested return communication path (e.g., for an initial communication or for switching from a currently used return communication path to the respective uncongested return communication path). In step 930 one or more communication restrictions may be enforced on a utilized return communication path to reduce the effect of a communication on the overall congestion of the utilized return communication path. As mentioned above, a given uncongested return communication path is only eligible for reuse (by the particular communicating device) after the given uncongested return communication path has been uncongested for a minimum length/period of time (e.g., a slow transition back to a previously congested path/channel, to ensure that not too many terminals begin using that path/channel once again). Also, example communication restrictions may be rules such as limiting message length, limiting number of messages, transmitting high-priority communications before (or in favor of) low-priority communications, transmitting only high-priority communications, using a limited set of ground station servers, using a limited set of channels, delaying communication until an uncongested state is reached, limiting communication to only emergency destinations, limiting communication to sending only location information and an emergency message, and so on. Note that as detailed above, there may be a plurality of threshold levels of congestion, and in such embodiments, there are also corresponding levels of mitigation (e.g., imposing greater restrictions for greater/stricter levels of mitigation).

Optionally, in step 935 the terminals may be configured to (or may be instructed to) adaptively adjusting an acknowledgment timeout period on one or more of the plurality of distributed modules for retransmitting communications corresponding to the level of congestion on the return communication path, as described above.

The procedure 900 may then repeat to monitor the communication channels for congestion, and mitigate the congestion, accordingly.

It should be noted that certain steps within procedures 500, 700, and 900 may be optional as described above, and the steps shown in FIGS. 5, 7, and 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500, 700, and 900 are described separately, certain steps from each procedure may be incorporated into each other procedure, and the procedures are not meant to be mutually exclusive.

Advantageously, the techniques herein provide for mitigation of congestion in satellite communication networks, for both forward communication paths and return communication paths, and based on ground station control and/or distributed module/terminal control (when possible). In particular, the techniques herein prevent a communication network, which operates with multiple transmitting emitters using shared bandwidth over satellite links, from becoming blocked by CCI (or from exceeding regulatory limitations) under high channel utilization. This is especially important where the distributed modules/terminals cannot communicate with each other (and as such, may not be aware of communications from the other modules). In certain embodiments, it is also important to note that the congestion information may not be real-time but only near-real-time, and as such the techniques herein allow for operating on "old" (rather than "current") information to estimate forward and/or return path utilization. That is, unlike other types of congestion mitigation (e.g., cellular networks), the techniques herein may be used in an environment with relatively substantial delays in the communication link (e.g., round-trip-times in the range of 240 ms-280 ms), and where congestion may be inferred from a broadcast of the ground station via a satellite, rather than relying on being able to "hear" communications from other modules (since in most instances, the distributed modules in a satellite communication network are unable to hear each other).

The techniques herein also prevent network "meltdown" under heavy loads. For example, the techniques herein prevent the scenario where too many terminals send messages to a limited-capacity ground station at the same time, such that many of messages step on each other and cannot be demodulated properly by the ground station. In such a scenario, since the terminals do not receive a returned acknowledgment (ACK) of their transmission (on the return path), they may attempt to resend their messages, thus further increasing the volume of communications, to the point where the channel breaks down (becomes generally unusable) under congestion. Accordingly, by effectively mitigating detected levels of (or signs of) congestion, the techniques herein stop the exacerbation of congestion before this critical point is reached.

An end result of the advantages herein is thus improved communication experience for satellite communications, particularly when operating over a highly utilized channel, where at best, users/devices are moved to an uncongested channel (perhaps even unknowingly), and at worst, merely experience restricted and/or throttled usage (e.g., limited number of messages, message length, emergency messages only, etc.). In this manner, under variable load conditions, the techniques herein ensure that the satellite network is able to continue providing service to users/devices of the network.

Notably, other advantages and additional implementation (use-case) embodiments of techniques described above may be readily apparent to those skilled in the art, and those specifically mentioned herein are not meant to limiting to the scope of the present disclosure.

While there have been shown and described illustrative embodiments that mitigate congestion in satellite communication networks (forward paths and/or return paths), it is to be understood that various other adaptations and modifications may be made within the scope of the embodiments herein. For example, the embodiments may, in fact, be used in a variety of types of wireless communication networks and/or protocols, and need not be limited to the illustrative satellite network implementation. For instance, in addition to geostationary orbit (GEO) satellites and low earth orbit (LEO) satellites, other communication techniques, particularly long-distance communication where distributed modules/devices are unaware of each other's transmissions, may also be used herein. Furthermore, while the embodiments may have been demonstrated with respect to certain communication environments, physical environments, or device form factors, other configurations may be conceived by those skilled in the art that would remain within the contemplated subject matter of the description above.

Note further that as mentioned above, the use of the terms "mobile devices", "terminals", "stations", "modules", "distributed modules", "corresponding modules", "communication transmitters", and so on may be used interchangeably herein as a communicating device (whether controlled by a user or automated, and whether mobile or stationary) that is configured to perform one side of the satellite communication techniques described herein. Additionally, the terms "gateway", "ground station", "ground station server", "ground station receiver" and so on may also be used interchangeably herein as the communicating device on the other side of the satellite communication techniques described herein.

In particular, the foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by an endpoint communicating device, a level of congestion on a particular return uplink communication path via an intermediate satellite from a plurality of distributed modules to a ground station server of a multiple-access shared communication media satellite communication system, wherein the endpoint communicating device comprises a particular distributed module of the plurality of distributed modules;
    determining, by the endpoint communicating device, whether the level of congestion is above a threshold based on an estimated amount of aggregate traffic the plurality of distributed modules are transmitting to the ground station server within a given time period; and
    mitigating the congestion, by the endpoint communicating device in response to the level of congestion being above the threshold, wherein mitigating comprises:
        determining an uncongested return uplink communication path via a satellite of the satellite communication system from the particular distributed module to the ground station server, ensuring that communicating on the uncongested return uplink communication path would prevent any interference with one or more unintended receivers, and then causing the particular distributed module to use the uncongested return uplink communication path.

2. The method as in claim 1, further comprising:
    determining the estimated amount of aggregate traffic by the ground station server; and
    sending, from the ground station server to the plurality of distributed modules, one or more of: the level of congestion; the estimated amount of aggregate traffic; or explicit instructions to cause particular distributed modules to use the uncongested return uplink communication path.

3. The method as in claim 1, further comprising:
    determining the estimated amount of aggregate traffic by the particular distributed module by listening to and tracking all active communication from the ground station server to the plurality of distributed modules.

4. The method as in claim 3, further comprising:
    inferring the estimated amount of aggregate traffic from all modules to the ground station on the particular return uplink communication path.

5. The method as in claim 3, wherein determining the estimated amount of aggregate traffic by the particular distributed module comprises:
    listening to and tracking all acknowledgment messages from the ground station server to the plurality of distributed modules.

6. The method as in claim 1, wherein the estimated amount of aggregate traffic is based on a number of the plurality of distributed modules communicating at a given time, and wherein the level of congestion is based on a proportion of the number of the plurality of distributed modules communicating compared to a maximum number of distributed modules allowed to communicate at the given time.

7. The method as in claim 1, wherein the estimated amount of aggregate traffic is based on a number of packets being sent at a given time, and wherein the level of congestion is based on a proportion of the number of packets being sent compared to a maximum number of packets allowed to be sent at the given time.

8. The method as in claim 1, wherein determining the level of congestion further comprises:
    determining the level of congestion by the particular distributed module based on information broadcast from the ground station server.

9. The method as in claim 1, wherein mitigating the congestion further comprises enforcing one or more communication restrictions on a utilized return uplink communication path to reduce effects of a communication on overall congestion of the utilized return uplink communication path, further wherein the one or more communication restrictions are selected from a group consisting of: limiting message length; limiting number of messages; transmitting high-priority communications with a lower threshold for time delay than low-priority communications; transmitting only high-priority communications; using a limited set of ground station servers; using a limited set of channels; delaying communication until an uncongested state is reached; limiting communication to only emergency destinations; and limiting communication to sending only location information and an emergency message.

10. The method as in claim 1, wherein there are a plurality of threshold levels of congestion, and wherein there are corresponding levels of mitigation.

11. The method as in claim 10, further comprising:
    imposing greater restrictions for stricter levels of mitigation.

12. The method as in claim 1, wherein a given uncongested return uplink communication path is only eligible for reuse by the endpoint communicating device after the given uncongested return uplink communication path has been uncongested for a minimum period of time.

13. The method as in claim 1, wherein the level of congestion assumes a reserved bandwidth for of emergency communications.

14. The method as in claim 1, further comprising:
    adaptively adjusting an acknowledgment timeout period on one or more of the plurality of distributed modules for retransmitting communications corresponding to the level of congestion on the return uplink communication path.

15. The method as in claim 1, wherein certain modules of the one or more modules are configured to switch from a currently used return uplink communication path to the uncongested return uplink communication path.

16. The method as in claim 1, wherein determining the level of congestion comprises:
    using historical information about communication patterns of the particular return uplink communication path to determine an expected level of congestion at a given time; and
    wherein mitigating the congestion is to mitigate against expected congestion.

17. An apparatus, comprising:
one or more communication interfaces to communicate within a multiple-access shared communication media satellite communication system;
a processor coupled to the interfaces and adapted to execute one or more processes; and
a memory configured to store a communicating process executable by the processor, the process, when executed by an endpoint communicating device comprising a particular distributed module of a plurality of distributed modules of the satellite communication system, operable to:
determine a level of congestion on a particular return uplink communication path via an intermediate satellite from the plurality of distributed modules to a ground station server of the satellite communication system;
determine whether the level of congestion is above a threshold based on an estimated amount of aggregate traffic the plurality of distributed modules are transmitting to the ground station server within a given time period; and
mitigate the congestion, in response to the level of congestion being above the threshold, wherein to mitigate the process is configured to:
determine an uncongested return uplink communication path via a satellite of the satellite communication system from the particular distributed module to the ground station server, ensure that communicating on the uncongested return uplink communication path would prevent any interference with one or more unintended receivers, and then causing the particular distributed module to use the uncongested return uplink communication path.

18. The apparatus as in claim 17, wherein the process when executed is further operable to:
determine the estimated amount of aggregate traffic at the ground station server; and
send, from the ground station server to the plurality of distributed modules, one or more of: the level of congestion; the estimated amount of aggregate traffic; or explicit instructions to cause particular distributed modules to use the uncongested return uplink communication path.

19. The apparatus as in claim 17, wherein the process when executed is further operable to:
determine the estimated amount of aggregate traffic at the particular distributed module by listening to and tracking all active communication from the ground station server to the plurality of distributed modules.

20. The apparatus as in claim 17, wherein the estimated amount of aggregate traffic is based on a number of the plurality of distributed modules communicating at a given time, and wherein the level of congestion is based on a proportion of the number of the plurality of distributed modules communicating compared to a maximum number of distributed modules allowed to communicate at the given time.

21. The apparatus as in claim 17, wherein the process when executed to determine the level of congestion is further operable to:
determine the level of congestion at the particular distributed module based on information broadcast from the ground station server.

22. The apparatus as in claim 17, wherein there are a plurality of threshold levels of congestion, and wherein there are corresponding levels of mitigation.

23. A tangible, non-transitory, computer-readable medium having computer-executable instructions stored thereon that, when executed by a processor on a computer, wherein the computer is an endpoint device that comprises a particular distributed module of a plurality of distributed modules of a multiple-access shared communication media satellite communication system, cause the computer to perform a method comprising:
determining a level of congestion on a particular return uplink communication path via an intermediate satellite from the plurality of distributed modules to a ground station server of the satellite communication system;
determining whether the level of congestion is above a threshold based on an estimated amount of aggregate traffic the plurality of distributed modules are transmitting to the ground station server within a given time period; and
mitigating the congestion, in response to the level of congestion being above the threshold, wherein mitigating comprises at least one of either:
determining an uncongested return uplink communication path via a satellite of the satellite communication system from the particular distributed module to the ground station server, ensuring that communicating on the uncongested return uplink communication path would prevent any interference with one or more unintended receivers, and then causing the particular distributed module to use the uncongested return uplink communication path.

* * * * *